US011928527B2

(12) United States Patent
Kajimoto (10) Patent No.: US 11,928,527 B2
(45) Date of Patent: Mar. 12, 2024

(54) INFORMATION PROCESSING APPARATUS, AND METHOD OF CONTROLLING COMMUNICATION BETWEEN CONTAINER AND PROCESS IN THE INFORMATION PROCESSING APPARATUS

(71) Applicant: CANON KABUSHIKI KAISHA, Tokyo (JP)

(72) Inventor: Masahiro Kajimoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 349 days.

(21) Appl. No.: 17/213,385

(22) Filed: Mar. 26, 2021

(65) Prior Publication Data

US 2021/0318918 A1 Oct. 14, 2021

(30) Foreign Application Priority Data

Apr. 8, 2020 (JP) .................................. 2020-070007

(51) Int. Cl.
*G06F 9/54* (2006.01)
*G06F 9/455* (2018.01)

(52) U.S. Cl.
CPC .............. *G06F 9/544* (2013.01); *G06F 9/455* (2013.01); *G06F 9/546* (2013.01); *G06F 2209/548* (2013.01)

(58) Field of Classification Search
CPC .................................. G06F 9/54; G06F 9/455
See application file for complete search history.

(56) References Cited

U.S. PATENT DOCUMENTS

| 11,500,699 B2* | 11/2022 | Sethi | G06F 9/545 |
| 2013/0227587 A1 | 8/2013 | Deng et al. | |
| 2016/0335107 A1* | 11/2016 | Behera | H04L 41/0806 |
| 2017/0180249 A1* | 6/2017 | Shen | H04L 41/0806 |

(Continued)

FOREIGN PATENT DOCUMENTS

JP 2016-173741 A 9/2016

OTHER PUBLICATIONS

European Search Report dated Jul. 15, 2021, in related European Patent Application No. 21164686.4.

*Primary Examiner* — Brian W Wathen
(74) *Attorney, Agent, or Firm* — VENABLE LLP (57) ABSTRACT

An information processing apparatus includes a first obtaining unit that references a first storage unit and obtains a communication method of communication data corresponding to a transmission source information and transmission destination information included in data received by a reception unit, and a second obtaining unit that references a second storage unit and obtains the content of transmission destination corresponding to the transmission source information and the transmission destination information included in the received data. The content of the transmission destination indicates destination information used in the obtained communication method, and a transmission unit transmits, to a container or a process of the transmission destination indicated by the transmission source information included in the received data, the communication data according to the communication method obtained by the first obtaining unit and the content of transmission destination obtained by the second obtaining unit.

10 Claims, 10 Drawing Sheets

COMMUNICATION TARGET INFORMATION

| TRANSMISSION SOURCE (ID, ETC.) 501 | DESTINATION (ID, ETC.) 502 | CONTENT OF DESTINATION 503 |
|---|---|---|
| COPY CONTAINER | SCANNER CONTROL MODULE | /path/to/socket.sock |
| FAX CONTAINER | FAX CONTROL MODULE | 0x0000-0x1000 (or shm ID) |
| REMOTE UI CONTAINER | PRINT CONTROL MODULE | msgKey |
| ... | ... | ... |
| WEB BROWSER CONTAINER | NETWORK CONTROL MODULE | /path/to/socket.sock |

304

(56) References Cited

U.S. PATENT DOCUMENTS

2017/0344292 A1    11/2017  Sterin et al.
2018/0239631 A1*  8/2018  Behera ................ H04L 41/0806
2020/0274832 A1*  8/2020  Humphrey .............. G06F 9/545

* cited by examiner

COMMUNICATION METHOD CONVERSION TABLE 303

| | SCANNER CONTROL MODULE | PRINT CONTROL MODULE | FAX CONTROL MODULE | CONSOLE UNIT CONTROL MODULE | FINISHER CONTROL MODULE | NETWORK CONTROL MODULE |
|---|---|---|---|---|---|---|
| COPY CONTAINER | SOCKET | SOCKET | UNUSED | SOCKET | SHARED MEMORY | UNUSED |
| FAX CONTAINER | SHARED MEMORY | MESSAGE QUEUE | SHARED MEMORY | MESSAGE QUEUE | UNUSED | SHARED MEMORY |
| PRINT CONTAINER | UNUSED | SOCKET | UNUSED | SOCKET | SHARED MEMORY | UNUSED |
| REMOTE UI CONTAINER | MESSAGE QUEUE | MESSAGE QUEUE | SOCKET | UNUSED | MESSAGE QUEUE | MESSAGE QUEUE |
| WEB BROWSER CONTAINER | UNUSED | SOCKET | UNUSED | SOCKET | UNUSED | SOCKET |

FIG. 4B

COMMUNICATION METHOD CONVERSION TABLE — 402

| | COPY CONTAINER | FAX CONTAINER | ... | WEB BROWSER CONTAINER |
|---|---|---|---|---|
| SCANNER CONTROL MODULE | NETWORK | NETWORK | ... | NETWORK |
| PRINT CONTROL MODULE | NETWORK | SHARED MEMORY | ... | NETWORK |
| ... | ... | ... | ... | ... |
| NETWORK CONTROL MODULE | NETWORK | NETWORK | ... | NETWORK |

401 — (Scanner Control Module, Print Control Module, ..., Network Control Module)
303 — (Web Browser Container column)
403 — (row of ...)

FIG. 5

COMMUNICATION TARGET INFORMATION

| TRANSMISSION SOURCE (ID, ETC.) 501 | DESTINATION (ID, ETC.) 502 | CONTENT OF DESTINATION 503 |
|---|---|---|
| COPY CONTAINER | SCANNER CONTROL MODULE | /path/to/socket.sock |
| FAX CONTAINER | FAX CONTROL MODULE | 0x0000-0x1000 (or shm ID) |
| REMOTE UI CONTAINER | PRINT CONTROL MODULE | msgKey |
| ... | ... | ... |
| WEB BROWSER CONTAINER | NETWORK CONTROL MODULE | /path/to/socket.sock |

INFORMATION PROCESSING APPARATUS, AND METHOD OF CONTROLLING COMMUNICATION BETWEEN CONTAINER AND PROCESS IN THE INFORMATION PROCESSING APPARATUS

BACKGROUND OF THE INVENTION

Field of the Invention

The present invention relates to an information processing apparatus, and a method of controlling communication between a container and a process in the information processing apparatus.

Description of the Related Art

An application is constituted by one or more processes called a program. Generally, a single application is rarely constituted by a single process, and in most cases, processes are divided between each role. Thus, communication between a plurality of processes is necessary to run a single application. There are various methods of communicating between processes including socket communicate and pipes, shared memory, message queues, and the like, and the processes running on the same machine communicate via a function of the operating system (OS).

On the other hand, a technology called container-based virtualization has become more common. Container-based virtualization is a technology that runs a package, which encapsulates an executable file of a process called a container and an environment (for example, a library) that the execution file is run in, in a virtual space isolated from the space in which typical processes are run. The server industry is trending towards, using such container-based virtualization, systems in which applications typically constituted by typical non-isolated process groups are built using containers. In the technology described in Japanese Patent Laid-Open No. 2016-173741, inter-process communication for a typical collaborative operation of processes is replaced with inter-container communication, and the inter-container communication is performed via network communication.

When container-based virtualization technology is used in server applications as described above, basically all processes can be containerised. On the other hand, when container-based virtualization technology is used in embedded applications, the process that controls the hardware and is particular to the embedded system typically is not containerised and is configured as a process on the host machine. This is because the container, a virtual machine, is isolated from the host machine and controlling the hardware of the host machine from the container is basically impossible.

A method of enabling hardware control by decreasing the isolation feature of the container and accessing the host machine does exist. However, in container-based virtualization in which the layer below the OS is not virtualized may, when accessing the host machine, accidently delete files used by another container, change OS settings, and the like, and cause problems. Thus, using this method is not desirable. Accordingly, in a case where an embedded application is built using container-based virtualization technology, the process running on the host machine and the process running on the container co-exist, making inter-process communication across the container and the host machine necessary.

However, to execute inter-process communication between the container and the host machine, a method of enabling access from the container to the host machine, in other words, the method of decreasing the isolation feature described above, is necessary. However, because of the possibility of problems being caused, as described above, containers with a low isolation feature for each generated application are desirably not generated if possible.

SUMMARY OF THE INVENTION

An aspect of the present invention is to eliminate the above-mentioned problem with conventional technology.

A feature of the present invention is to provide a technique capable of suppressing problems caused in inter-process communication from a container to a host machine and aggregating communication responsibilities.

According to a first aspect of the present invention, there is provided an information processing apparatus including at least one container built via container-based virtualization technology and at least one process built on a host machine, which is a physical machine, the information processing apparatus comprising: a controller including at least one processor and at least one memory configured to function as: a first storage unit that stores a communication method in association with a container or a process of a transmission source and a container or a process of a transmission destination; a communication unit that controls communication between the container and the process, wherein the communication unit including: a reception unit that receives, from a container or a process of a transmission source, data including transmission source information indicating the transmission source, transmission destination information indicating a container or a process of a transmission destination, and communication data, a first obtaining unit that references the first storage unit and obtains a communication method of the communication data on the basis of the transmission source information and the transmission destination information received by the reception unit, and a transmission unit that transmits, to a container or a process of the transmission destination, the communication data according to the communication method obtained by the first obtaining unit.

According to a second aspect of the present invention, there is provided a method of controlling communication between a container and a process in an information processing apparatus including at least one container built via container-based virtualization technology, at least one process built on a host machine, which is a physical machine, and a storage unit that stores a communication method in association with a container or a process of a transmission source and a container or a process of a transmission destination, the method comprising: receiving, from a container or a process of a transmission source, data including transmission source information indicating the transmission source, transmission destination information indicating a container or a process of a transmission destination, and communication data; referencing the storage unit and obtaining a communication method of the communication data on the basis of the transmission source information and the transmission destination information received in the receiving; and transmitting, to a container or a process of the transmission destination, the communication data according to the communication method obtained in the obtaining.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following examples are not intended to limit the claims of the present invention, and that not all of the combinations of the aspects that are described according to the following examples are necessarily required with respect to the means to solve the problems according to the present invention. Also, the following examples are described using an image forming apparatus of a multi-function peripheral, for example, as an example of an information processing apparatus according to the present invention.

Container-based virtualization will first be described, as this understanding will be important when describing the examples. Container-based virtualization is a technology that runs a package, which encapsulates an executable file of a process called a container and an environment (for example, a library) that the execution file is run in, in a virtual space isolated from the typical process run on a physical machine via a function of Linux (registered trademark). A container run in the isolated space in this manner is referred to as a virtual machine. Also, a physical machine running a container is referred to as a host machine, and a process run on a host machine is referred to as a host process. A specific example of a container-based virtualization platform is Docker (registered trademark). Alternatively, the platform may be created using a function of Linux (registered trademark). The container-based virtualization platform can be changed within a range that does not depart from the essence of the present invention.

First Example

Figure 1:
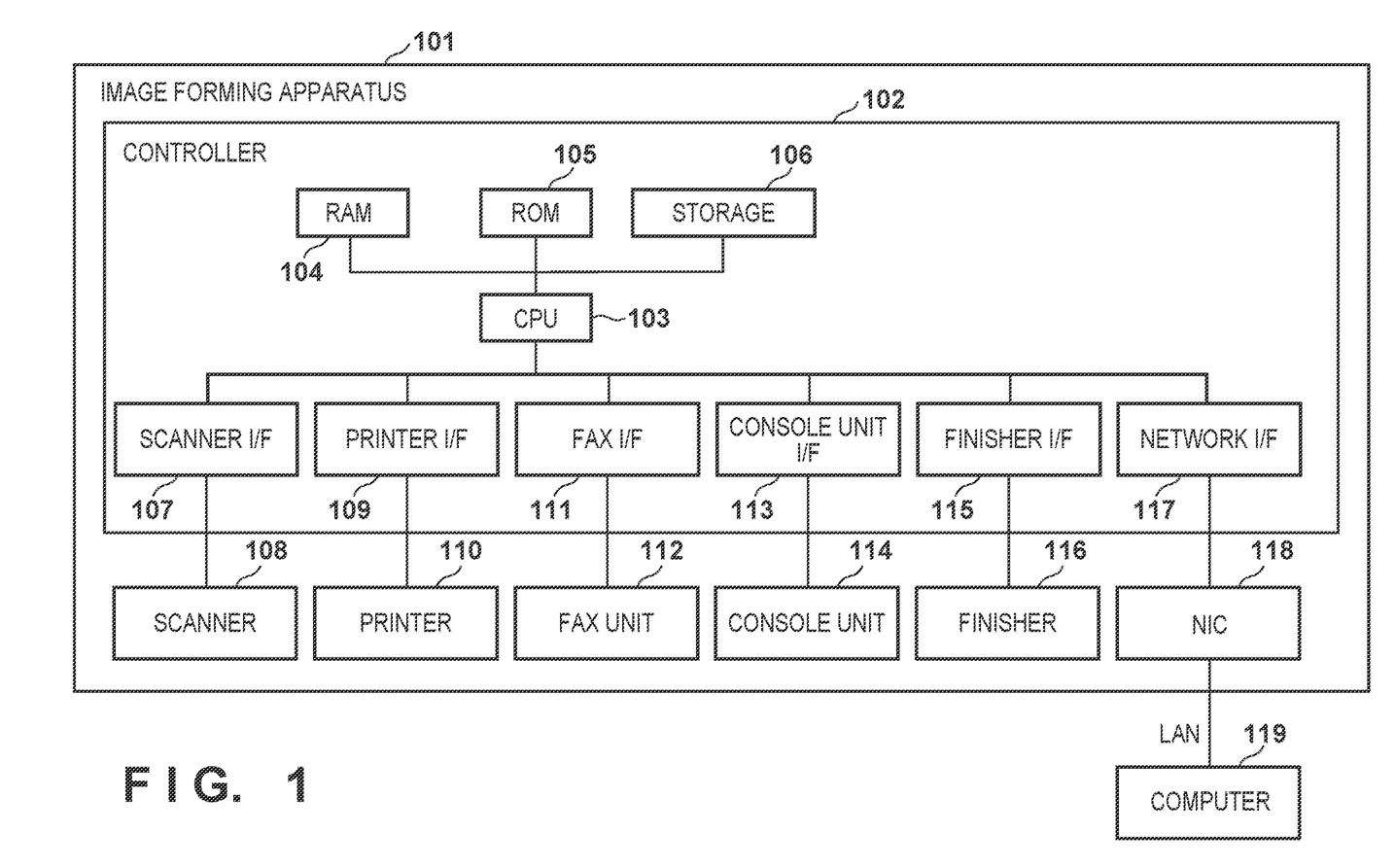
FIG. 1 is a block diagram for describing the hardware configuration of an image forming apparatus according to a first example of the present invention.

FIG. 1 is a block diagram for describing the hardware configuration of an image forming apparatus 101 according to the first example of the present invention. In the first example, the image forming apparatus 101 is a multi-function peripheral provided with a printer function, a scanner function, a data communication function, and the like. However, the present invention is not limited to a multi-function peripheral.

The image forming apparatus 101 includes a controller 102, a scanner 108, a printer 110, a FAX unit 112, a console unit 114, a finisher 116, and an NIC 118. NIC stands for a network interface card. The image forming apparatus 101 may be provided with other hardware as well. The scanner 108 optically reads an image of a document and outputs this as a digital image. The printer 110 outputs (prints) a sheet or the like according to the image data. The FAX unit 112 sends and receives digital image data via a phone line or the like. The console unit 114 receives an operation on the image forming apparatus 101 from the user and is provided with a touch panel or hard keys for displaying the processing state. The finisher 116 performs processing, such as discharging sheets, sorting, stapling, punching, cutting, and the like, on a sheet output from a sheet-discharge unit of the printer 110 of the image forming apparatus 101. The NIC 118 connects the image forming apparatus 101 to a communication network LAN.

The controller 102 controls all of the operations of the image forming apparatus 101 to implement the printer function, scanner function, and the like. The controller 102 includes a scanner interface (I/F) 107 for connecting to the scanner 108, a printer I/F 109 for connecting to the printer 110, and a FAX I/F 111 for connecting to the FAX unit 112. The controller 102 is further provided with a console unit I/F 113 for connecting to the console unit 114, a finisher I/F 115 for connecting to the finisher 116, and a network I/F 117 for connecting to the NIC 118. The NIC 118 is connected to a computer 119 via a LAN and receives information from the computer 119.

Also, the controller 102 is provided with a central processing unit (hereinafter, referred to as CPU 103) that executes software for operating the image forming apparatus 101; RAM 104, which is memory for storing data and the like for calculations by the CPU 103; ROM 105, which is memory for storing firmware executed by the CPU 103; storage 106 used for long-term data storage; and the like.

Examples of the executable functions of the image forming apparatus 101 will be described below.

Copying Function

The image data obtained from the scanner 108 reading a document is stored in the storage 106 and printed using the printer 110.

Image Transmission Function

The image data obtained from the scanner 108 reading a document is transmitted to the computer 119 connected to the network via the NIC 118.

Image Storage Function

The image data obtained from the scanner 108 reading a document is stored in the storage 106 and transmitted or printed as necessary.

Image Printing Function

For example, analyze the page description language transmitted from the computer 119 connected to the network and print via the printer 110.

The console unit 114 is connected to the controller 102; is provided with a touch panel, a power saving button, a copy button, a cancel button, a reset button, a ten-key number pad, a user mode key, and the like; and provides a user I/F (UI).

Figure 2:
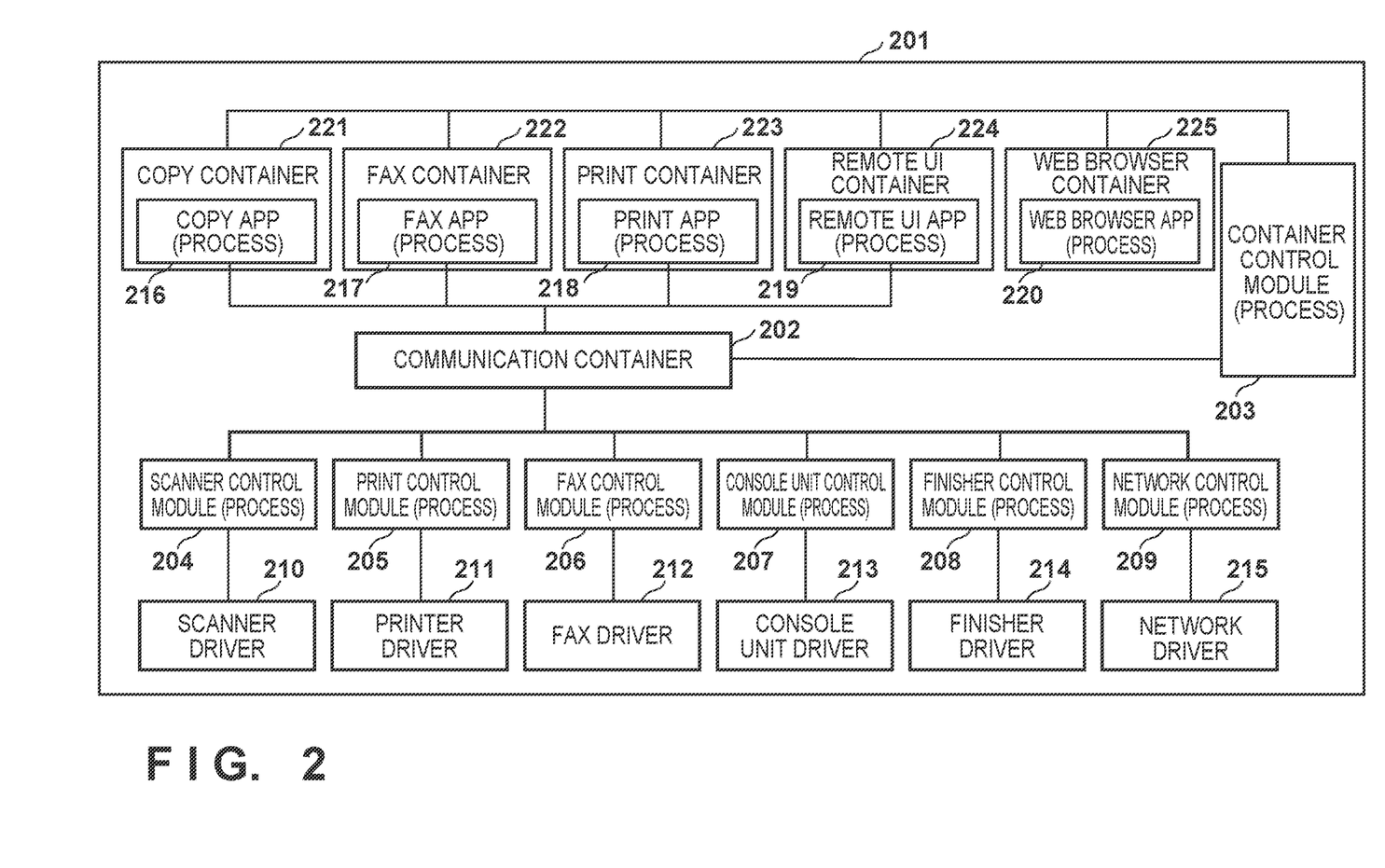
FIG. 2 is a block diagram for describing the configuration of firmware for operating the image forming apparatus according to the first example.

FIG. 2 is a block diagram for describing the configuration of firmware 201 for operating the image forming apparatus 101 according to the first example.

The CPU 103 of the image forming apparatus 101 executes various functions according to the contents of the firmware 201. The firmware 201 includes a container control module 203 and a communication container 202. The firmware 201 further includes application containers 221 to 225 respectively including applications 216 to 220 containerised by container-based virtualization technology, the applications 216 to 220 being executable by the image forming apparatus 101. The firmware 201 also further includes control modules 204 to 209 that control the hardware of the image forming apparatus 101 and device drivers 210 to 215.

For example, a copy application 216 is software for implementing a copying function of the image forming apparatus 101, and the copy container 221 is the containerised copy application 216. In a similar manner, the FAX container 222 is the containerised FAX application 217, and the print container 223 is the containerised print application 218. Also, the remote UI container 224 is the containerised remote UI application 219, and the web browser container 225 is the containerised web browser application 220. When the application containers 221 to 225 operate the hardware of the image forming apparatus 101, the application containers 221 to 225 communicate with the control modules 204 to 209 via the communication container 202.

A scanner control module 204 controls the scanner 108 using a control function provided by a scanner driver 210. In a similar manner, a print control module 205 controls the printer 110 using a control function provided by a printer driver 211. Also, a FAX control module 206 controls the FAX unit 112 using a control function provided by a FAX driver 212. A console unit control module 207 controls the console unit 114 using a control function provided by a console unit driver 213. A finisher control module 208 controls the finisher 116 using a control function provided by a finisher driver 214. A network control module 209 controls the NIC 118 using a control function provided by a network driver 215.

The communication container 202 and the application containers 221 to 225 are managed by the container control module 203 in terms of activation, completion, stopping, and the like.

In the first example, such as the container control module 203, a control module that centrally controls the containers, is used. However in other examples, the container control module 203 may not be provided, and the activation, completion, stopping, and the like of the application containers may be performed separately. Also, the number and types of processes illustrated in FIG. 2 are merely examples and are not intended to limit the applicable range of the present invention.

Figure 3:
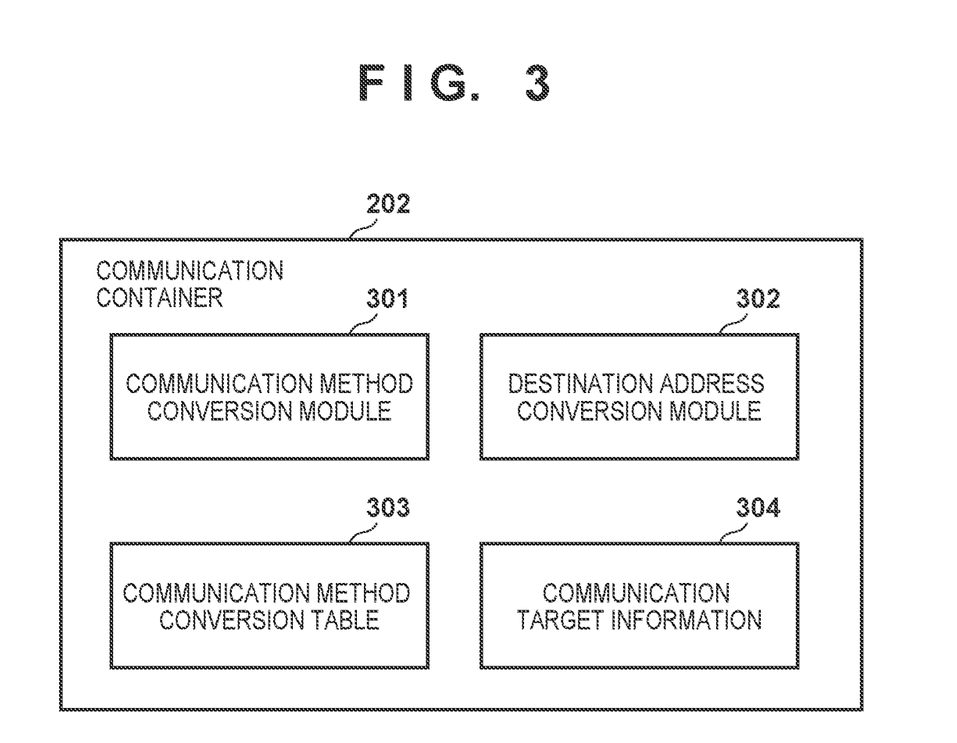
FIG. 3 is a functional block diagram for describing the functional configuration of a communication container according to the first example.

FIG. 3 is a functional block diagram for describing the functional configuration of the communication container 202 according to the first example.

The communication container 202 includes a communication method conversion module 301, a destination address conversion module 302, a communication method conversion table 303, and communication target information 304. Note that in the first example, the communication container 202 is a container. However, as long as the communication method conversion and destination address conversion described below can be executed, a different configuration may be employed.

The communication method conversion module 301 references the communication method conversion table 303 and changes the communication method on the basis of transmission source information and destination information. Also, the communication method conversion module 301 converts the format of the data in accordance with the change in the communication method. The destination address conversion module 302 obtains, from the communication target information 304, content used in the communication method converted to by the communication method conversion module 301. For example, when message queue communication is performed, the destination address conversion module 302 obtains a message key or the like. In the first example, an embedded system is employed, and thus the communication method conversion table 303 and the communication target information 304 of the communication container 202 are known information. However, a system may be employed in which the information can be dynamically added and deleted.

Figure 4A:
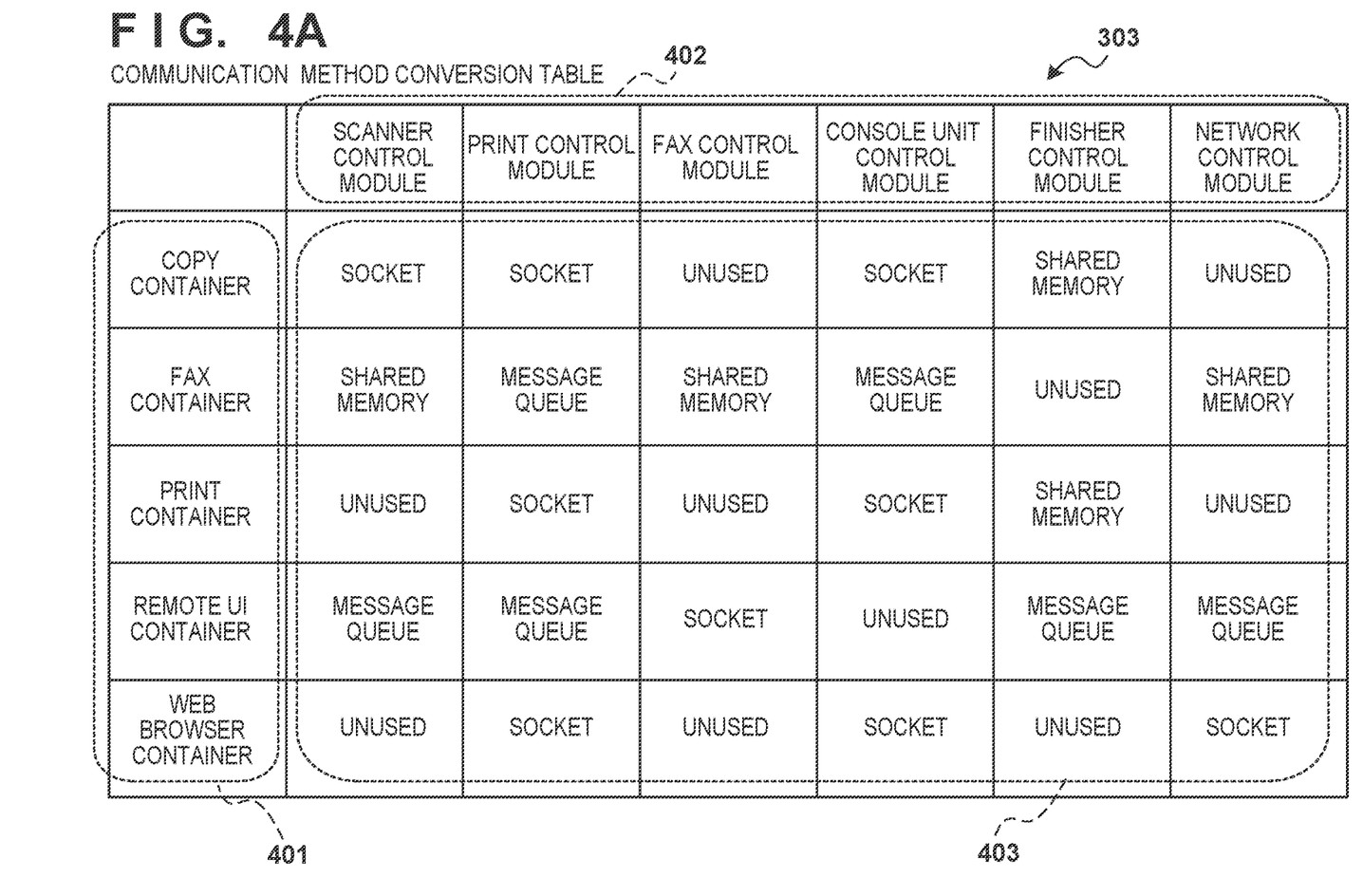
FIGS. 4A and 4B are diagrams illustrating examples of the configuration of a communication method conversion table according to the first example.
Figure 4B:
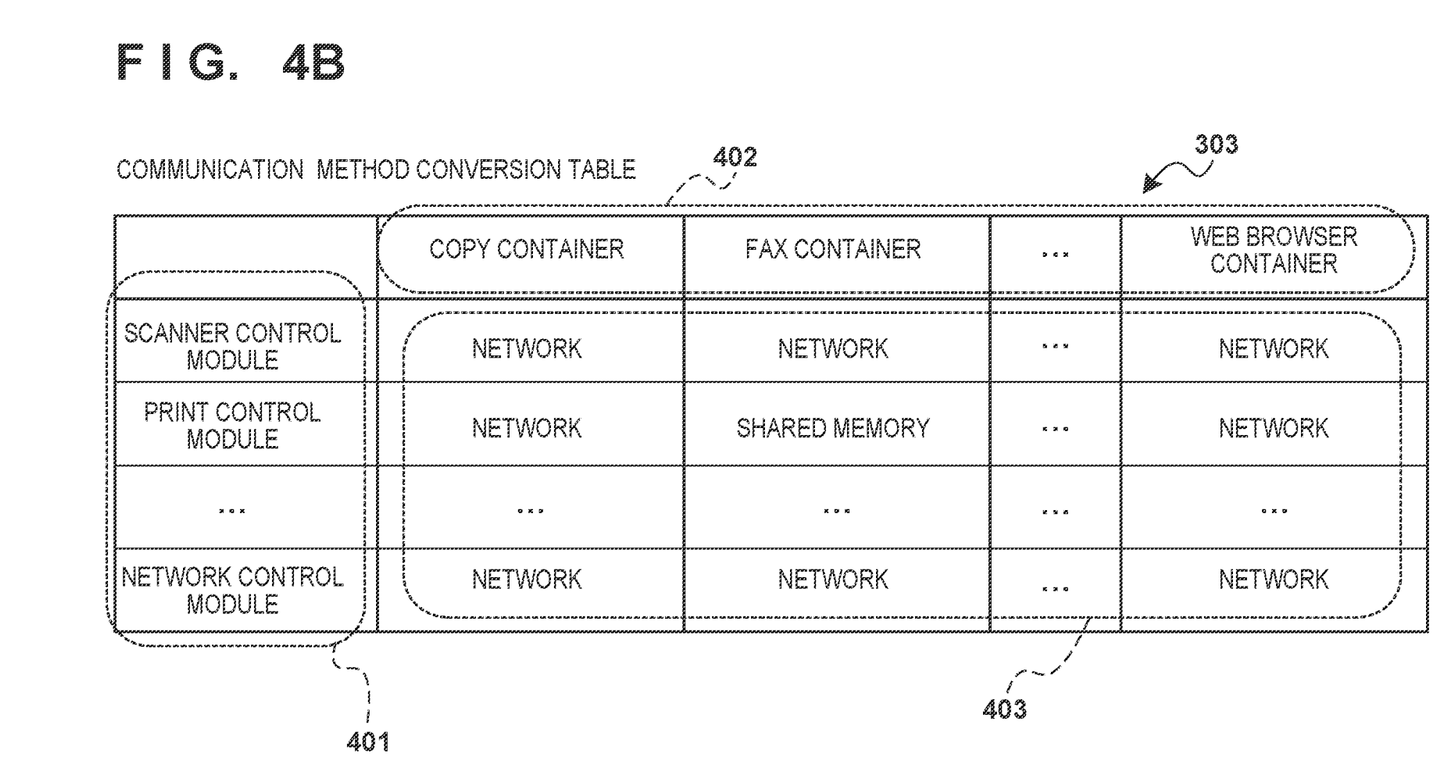

FIGS. 4A and 4B are diagrams illustrating an example of the configuration of the communication method conversion table 303 according to the first example.

The communication method conversion table 303 is a table for deriving communication information 403 from transmission source information 401 and destination information 402, and as indicated in the drawings, the communication information 403 is stored with the transmission source information 401 and the destination information 402 associated together. Note that the table is stored in the storage 106, for example. Herein, the transmission source information 401 and the destination information 402 are information, such as a container ID, a process ID, a container name, a process name, and the like. Also, the communication information 403 is communication method information used in communication from the communication container 202 to the containers 221 to 225 or the control modules (host processes) 204 to 209 indicated by the destination information 402. For example, in a case of communications from the copy container 221 to the scanner control module 204, information called socket information is obtained. Also, for paths along which communications are not performed such as from the copy container 221 to the FAX control module 206, information indicating not used (unused) is noted. Note that in FIGS. 4A and 4B, "socket" refers to socket communicate, "shared memory" refers to creating, on the memory, a memory area able to be accessed from another process or container and communicating via this memory area. "Message queue" refers to communicating via messages placed on queues.

Note than FIG. 4A illustrates the communication method conversion table 303 in a case where the transmission source information 401 corresponds to the application containers 221 to 225, and the destination information 402 corresponds to the host processes 204 to 209. Also, FIG. 4B illustrates the communication method conversion table 303 in a case where the transmission source information 401 corresponds to the host processes 204 to 209, and the destination information 402 corresponds to the application containers 221 to 225.

The communication information 403 is information indicating the communication method used in communication from the communication container 202 to the containers 221 to 225 or the host processes 204 to 209 indicated by the destination information 402. Accordingly, as illustrated in FIG. 4B, in a case where the destination information 402 indicates containers, network communication is basically expected. In a case where all of the communication combinations use network communication, all of the communications may be converted to network communication and the communication method conversion table illustrated in FIG. 4B may not be stored.

Note that the communication from the transmission source to the communication container 202 is not particularly limited and be freely selected without departing from the spirit of the present invention.

Figure 5:
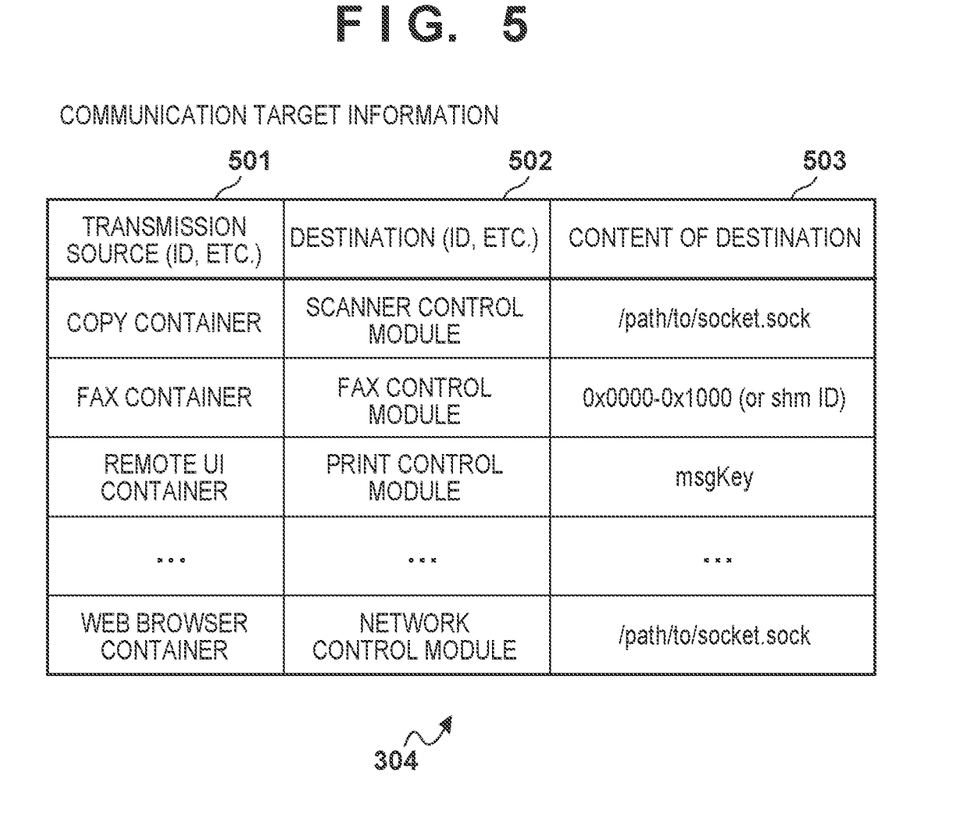
FIG. 5 is a diagram illustrating an example of communication target information according to the first example.

FIG. 5 is a diagram illustrating an example of the communication target information 304 according to the first example.

The communication target information 304 is used to obtain content 503 of the destination from a transmission source 501 and a destination 502. The content 503 of the destination may be obtained in various formats so as to correspond to the communications between the plurality of processes. Note that the content 503 of the destination may be embedded in the communication method conversion table 303 and be able to be obtained all at once when the communication information 403 is converted.

For example, transmission from the copy container 221 to the scanner control module 204 is a socket communication, as seen in FIG. 4A. Accordingly, the content 503 of the destination indicates the path of the socket, for example, "/path/to/socket.sock". Also, the transmission from the FAX container 222 to the FAX control module 206 is a shared memory, as seen in FIG. 4A. Accordingly, the content 503 of the destination indicates a shared memory address. Furthermore, the transmission from the remote UI container 224 to the print control module 205 is a message queue, as seen in FIG. 4A. Accordingly, the content 503 of the destination indicates message queue key information (msgKey).

Figure 6:
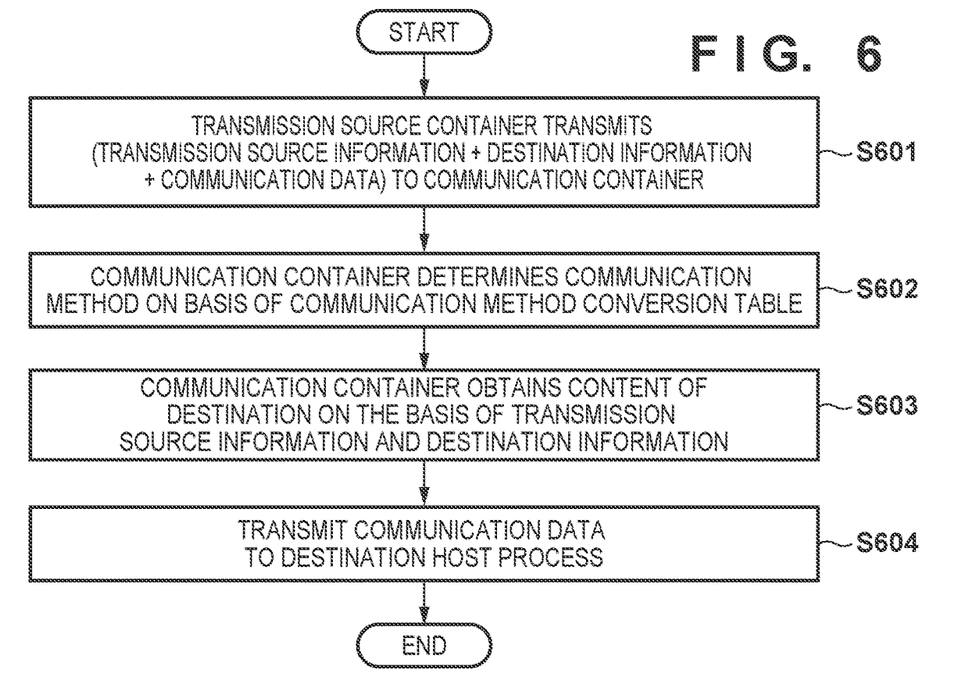
FIG. 6 is a flowchart for describing the communications from a container to a host process in the image forming apparatus according to the first example.

FIG. 6 is a flowchart for describing the communications from a container to a host process in the image forming apparatus 101 according to the first example.

In a case of communications from a container to a host process via the communication container 202, first, in step S601, the transmission source container transmits to the communication container 202: the transmission source information 401+the destination information 402+actual data information for transmission. In this manner, the communication container 202 receives the data. Note that a configuration may be employed in which the transmission source information 401 is not included in this data configuration and is obtained when the communication container 202 establishes communication.

Next, the process proceeds to step S602, and the communication container 202 references the communication method conversion table 303 and determines the communication method on the basis of the data received in step S601.

Then, the process proceeds to step S603, and the communication container 202 references the communication target information 304 of FIG. 5, for example, and obtains the content 503 of the destination on the basis of the transmission source information 401 and the destination information 402. Next, the process proceeds to step S604, and the communication container 202 transmits the communication data to a destination address corresponding to the content 503 of the destination (host process) obtained in step S603. In this manner, communication from a container to a host process can be implemented.

Figure 7:
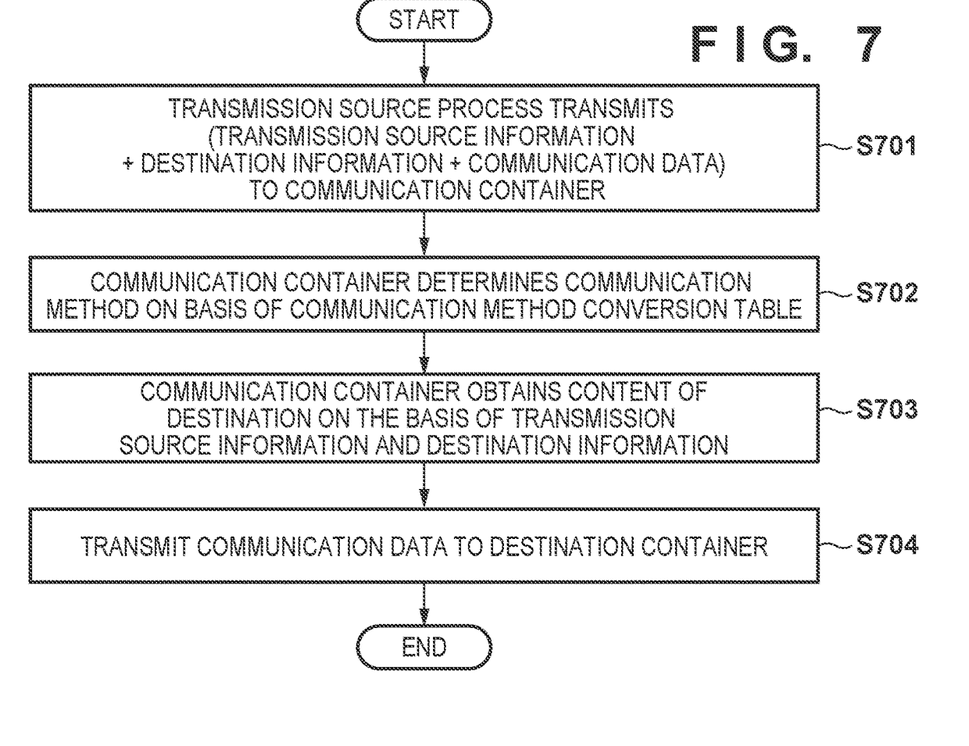
FIG. 7 is a flowchart for describing the communications from a host process to a container in the image forming apparatus according to the first example.

FIG. 7 is a flowchart for describing the communications from a host process to a container in the image forming apparatus 101 according to the first example.

In a case of communications from a host process to a container via the communication container 202, first, in step S701, the transmission source process transmits to the communication container 202: the transmission source information 401+the destination information 402+actual data information for transmission. In this manner, the communication container 202 receives the data. Note that a configuration may be employed in which the transmission source information 401 is not included in this data configuration and is obtained when the communication container 202 establishes communication.

Next, the process proceeds to step S702, and the communication container 202 references the communication method conversion table 303 and determines the communication method on the basis of the data received in step S701. This is the same as in the processing of step S602 in FIG. 6 described above.

Then, the process proceeds to step S703, and the communication container 202 references the communication target information 304 of FIG. 5, for example, and obtains the content 503 of the destination (container) on the basis of the transmission source information 401 and the destination information 402. Next, the process proceeds to step S704, and the communication container 202 transmits the communication data to a destination address corresponding to the content 503 of the communication target container obtained in step S703. In this manner, communication from a host process to a container can be implemented.

Figure 8:
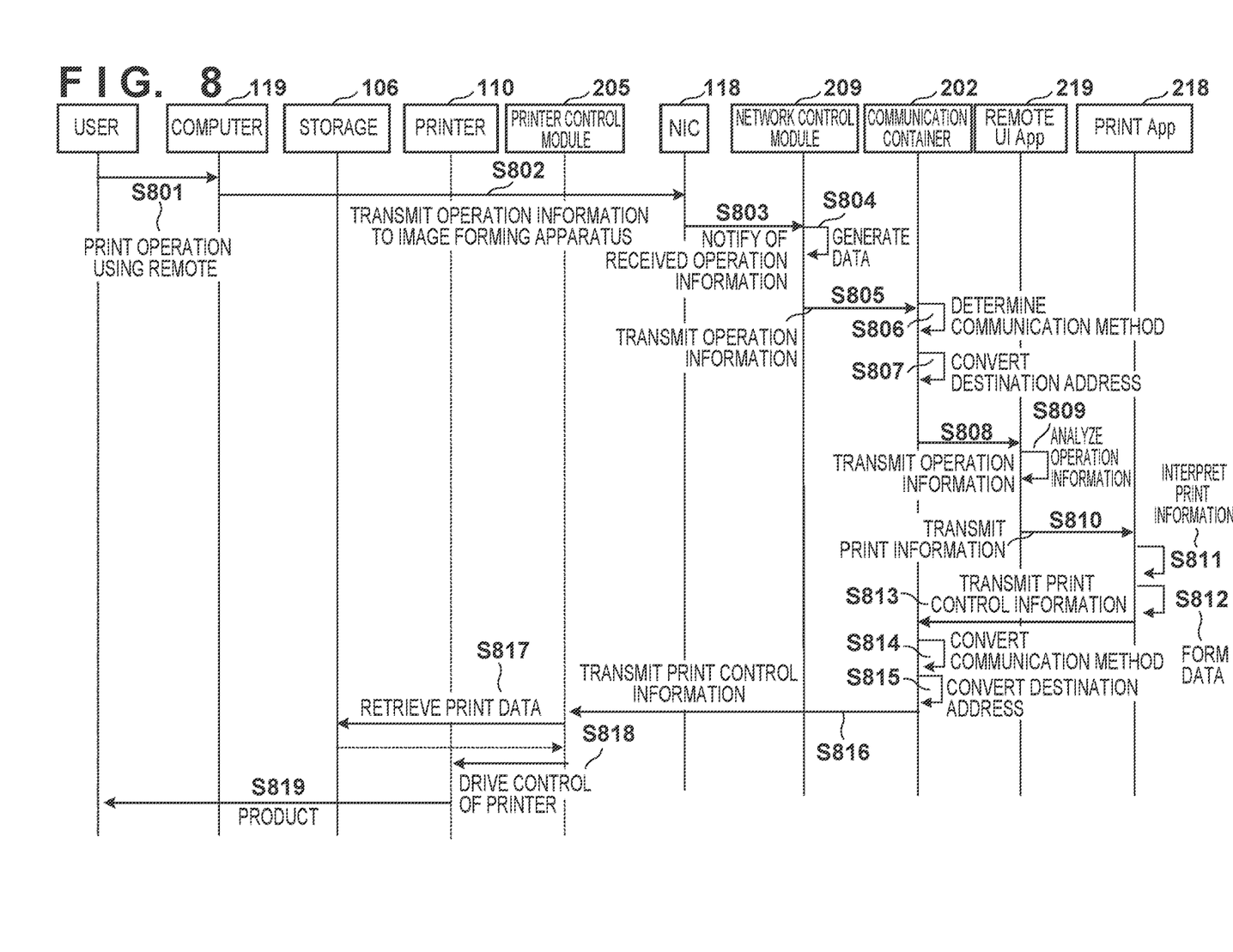
FIG. 8 is a sequence diagram for describing the flow of the processing when a user uses a remote UI to print data stored in the image forming apparatus, according to the first example.

FIG. 8 is a sequence diagram for describing the flow of the processing when a user uses the remote UI to print data stored in the image forming apparatus 101, according to the first example.

The user accesses the image forming apparatus 101 from an external network using the computer 119 and uses a remote UI application (App) 219. At this stage, first, in step S801, the user uses the computer 119 to perform a print operation. Accordingly, in step S802, the computer 119 transmits operation information to the image forming apparatus 101 via the network. Then, in step S803, the NIC 118 of the image forming apparatus 101 receives the operation information transmitted in step S802. Next, in step S803, the network control module 209 is notified of the received operation information.

Next, in step S804, the network control module 209 generates data for transmitting the notified operation information to the remote UI App 219. Then, in step S805, the network control module 209 transmits the operation information to the communication container 202. Note that the configuration of the data generated in step S804 is: the transmission source information 401+the destination information 402+actual data information for transmission. Specifically, in step S804, the network control module 209 generates data including: ID of the network control module 209+ID of the remote UI container 224+print operation information, place of the print data, and the like. Regarding the transmission source information 401 described above, a configuration may be employed in which the transmission source information 401 is not included in this data configuration and is obtained when the communication container 202 establishes communication. Also, the protocol may be format as long as the data configuration is included.

Next, the communication container 202 determines the communication method in step S806. The communication method is determined referencing the communication method conversion table 303. Next, the process proceeds to step S807, and the communication container 202 executes destination address conversion. The communication target information 304 is used in the destination address conversion processing. Specifically, the communication method from the network control module 209 to the remote UI container 224 is network communication. Thus, the IP address, container ID, and the like of the destination container are obtained from the communication target information 304 and set for the destination address.

Thereafter, in step S808, the communication container 202 transfers the operation information to the remote UI App 219. The operation information is the operation information received in step S805.

Next, in step S809, the remote UI App 219 analyzes the operation information received in step S808. Then, in step S810, the remote UI App 219 transmits print information to the print App 218. Accordingly, in step S811, the print App 218 interprets the print information. Then, in step S812, the print App 218 generates data for communicating with the communication container 202. As described above, the data configuration includes: the transmission source information 401+the destination information 402+actual data information for transmission. Specifically, included is: ID of the print container 223+process ID of the print control module 205+print information. Then, in step S813, the print App 218 transmits the print control information generated in step S812 to the communication container 202.

In this manner, in step S814, the communication container 202 determines the communication method. Herein, the transmission source is the print container 223, the destination is the print control module 205, and the communication method is socket communication. Then, in step S815, the destination address is converted. Specifically, the communication method from the print container 223 to the print control module 205 is socket communication. Thus, a path or the like from the communication target information 304 to the print control module 205, i.e., the destination, is obtained and set for the destination address.

Thereafter, in step S816, the communication container 202 transfers the print control information to the print control module 205. Accordingly, in step S817, the print control module 205 retrieves the print data stored in the storage 106. Then, in step S818, the print control module 205 controls the printer 110 to print according to the print data. As a result, in step S819, the product created by the printer 110 can be provided to the user.

According to the first example described above, when an embedded application is built, access rights to the host machine is not granted to a plurality of containers. This allows problems, such as writing on the wrong file, memory data failure, and the like, to be reduced or prevented, which contributes to improving quality.

Also, because the communication roles are aggregated, programs are prevented from being complex, which leads to improved manageability. Furthermore, limiting the access paths is advantageous in that the program debugging observability is improved.

Second Example

In the first example described above, communications are reliably established. However in reality, depending on the state during the operation, the target process or container isn't activated, a container or process is hacked by malicious code, and similar problems may occur. Accordingly, a configuration may be employed that includes a retry mechanism or a mechanism for preventing access from non-targets.

Figure 9:
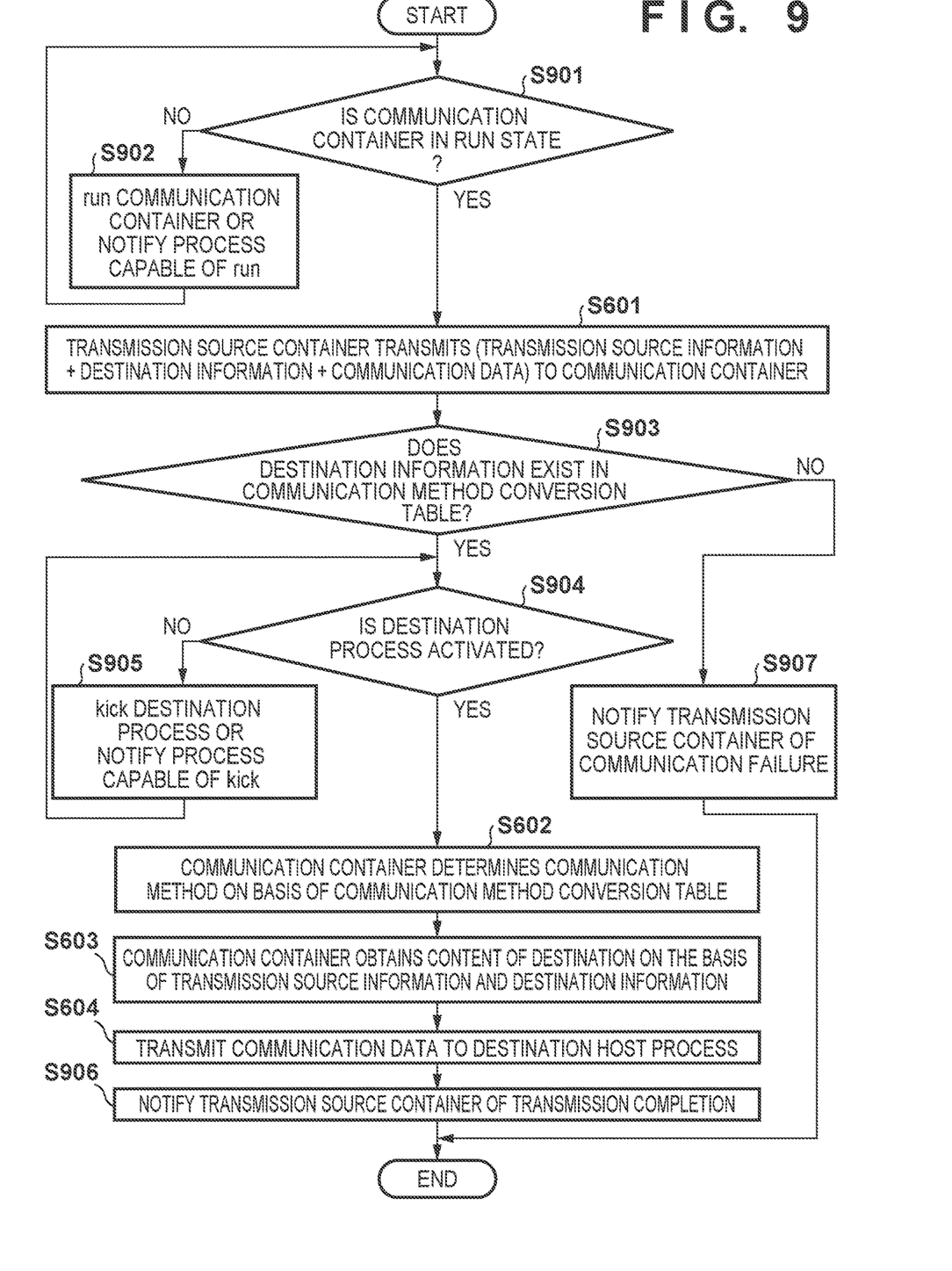
FIG. 9 is a flowchart for describing the communications from a container to a host process in an image forming apparatus according to a second example.

FIG. 9 is a flowchart for describing the communications from a container to a host process in the image forming apparatus 101 according to the second example. Note that in FIG. 9, the steps which execute the same processing as in the flowchart of FIG. 6 described above are given the same reference number, and the description thereof is omitted.

First, in step S901, it is determined whether or not the communication container 202, a key component to communication, is in the run state (operational state). In a case where the communication container 202 is determined to not be in the run state, the process proceeds to step S902 where the communication container 202 is run (activated) or the process, for example, the container control module 203, that executes run control is notified, and the process proceeds to step S901. In FIG. 9, step S902 is executed by a container. Accordingly, another path capable of running from a container to another container, for example, in the case of Docker, a docker.sock may be mounted to communicate with the Docker daemon dockerd. Also, alternatively, a configuration in which all of the containers are capable of communicating only with the container control module 203 is conceivable.

In step S903, it is determined whether or not the destination information (host process) exists in the communication method conversion table 303. In a case where it does not exist in the communication method conversion table 303, the process proceeds to step S907, the transmission source container is notified of the communication failure, and the process ends. Steps S903 and S907 contribute to improving the quality of the software by preventing unauthorized access.

Also, in step S903, in a case where it is determined that the destination information exists in the communication method conversion table 303, the process proceeds to step S904, and it is determined whether or not the destination process is activated. In a case where it is determined that the destination process is not activated, the process proceeds to step S905, and the destination process is kicked (activated) or a process capable of kick control is notified and the process proceeds to step S904.

Next, in steps S603 and S604, the communication container 202 obtains the content 503 of the destination and transmits the communication data to the obtained destination address. In this manner, communication from a container to a host process is implemented. Then, the process proceeds to step S906, communication completion is waited for, and the transmission source container is notified of communication success. This is to make a distinction between the failure of step S907.

In such cases when the communication container 202 is not activated when communications are transmitted from a container to a host process, activation is waited for before the container transmits the data to the communication container 202. Furthermore, when the destination process is not activated, the communication container 202 waits for the process to activate before transmitting the data. This is advantageous in preventing the process being hacked by malicious code due to the target process not being activated.

Figure 10:
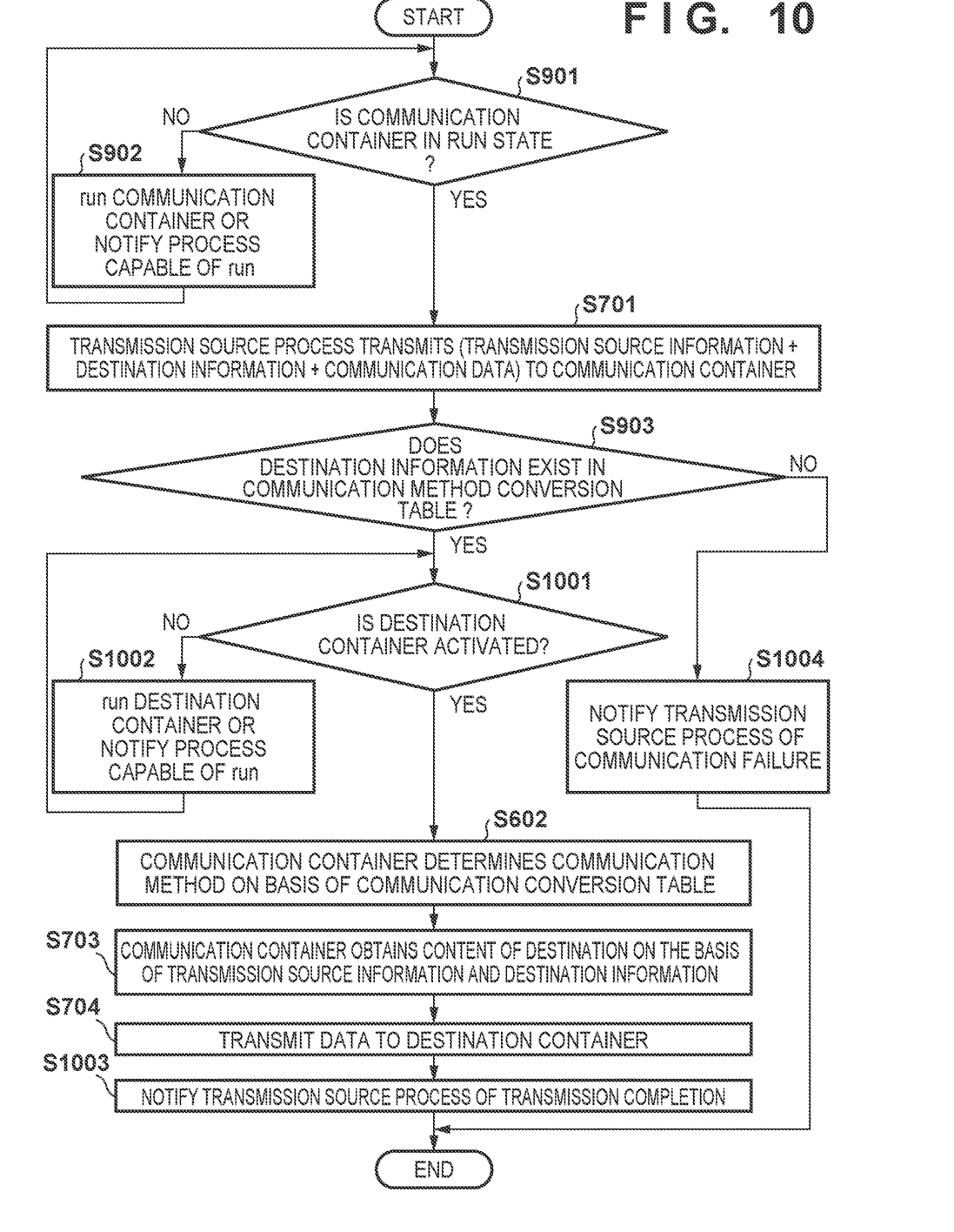
FIG. 10 is a flowchart for describing the communication processing from a host process to a container in the image forming apparatus according to the second example.

FIG. 10 is a flowchart for describing the communication processing from a host process to a container in the image forming apparatus 101 according to the second example. Note that in FIG. 10, the steps which execute the same processing as in the flowchart of FIGS. 7, and 9 described above are given the same reference number, and the description thereof is omitted.

In step S1001, it is determined whether or not the destination container is activated. In a case where it is determined that the destination container is not activated in step S1001, the process proceeds to step S1002, and the destination container is run (activated) or a process capable of run control is notified and the process proceeds to step S1001. In FIG. 10, step S1002 is executed by a host process. Thus, it is conceivable to provide a path for communicating with the container control module 203. Then, in step S1003, the host process of the transmission source is notified of transmission completion. On the other hand, in step S1004, the host process of the transmission source is notified of communication failure.

According to the second example described above, in addition to the advantages of the first example described above, in a case where the destination process or the destination container is not activated, the data is transmitted after the process or container is activated. This is advantageous in preventing the container or process being hacked by malicious code.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-70007, filed Apr. 8, 2020, which is hereby incorporated by reference herein in its entirety.

What is claimed is:

1. An information processing apparatus including at least one container built via container-based virtualization technology and at least one process built on a host machine, which is a physical machine, the information processing apparatus comprising:
a first storage unit that stores a communication method in association with a container or a process of a transmission source and a container or a process of a transmission destination;
a second storage unit that stores a content of a transmission destination in association with transmission source information and transmission destination information; and
a controller including at least one processor and at least one memory configured to:
a communication unit that controls communication between the container and the process,
wherein the communication unit includes:
a reception unit that receives, from a container or a process of a transmission source, data including the transmission source information indicating the container or the process of the transmission source, the transmission destination information indicating a container or a process of a transmission destination, and communication data,
a first obtaining unit that references the first storage unit and obtains a communication method of the communication data corresponding to the transmission source information and the transmission destination information included in the data received by the reception unit;
a second obtaining unit that references the second storage unit and obtains the content of transmission destination corresponding to the transmission source information and the transmission destination information included in the received data, wherein the content of the transmission destination indicates destination information used in the obtained communication method; and
a transmission unit that transmits, to the container or the process of the transmission destination indicated by the transmission source information included in the received data, the communication data according to the communication method obtained by the first obtaining unit and the content of transmission destination obtained by the second obtaining unit.

2. The information processing apparatus according to claim 1,
wherein the transmission unit transmits the communication data to a destination address corresponding to the content of the transmission destination.

3. The information processing apparatus according to claim 1, wherein the communication method includes at least one of socket communication, message queuing, communication via a memory area, or network communication.

4. The information processing apparatus according to claim 1, wherein, in a case where the transmission destination information indicates a container, the communication method is network communication.

5. The information processing apparatus according to claim 3, wherein, in a case where the communication method is the socket communication, the content is a path to a socket, in a case where the communication method is the message queuing, the content is a message key, and in a case where the communication method is the communication via a memory area, the content is an address of the memory area.

6. The information processing apparatus according to claim 1, wherein in a case where the communication unit is not activated when transmitting the data to the communication unit, the container and the process activate the communication unit.

7. The information processing apparatus according to claim 1, wherein in a case where a process of a transmission destination is not activated when transmitting data from the container to the process, the communication unit further activates the process of the transmission destination.

8. The information processing apparatus according to claim 1, wherein in a case where a container of a transmission destination is not activated when transmitting data from the process to the container, the communication unit further activates the container of the transmission destination.

9. The information processing apparatus according to claim 1, wherein in a case where the first obtaining unit cannot obtain the communication method of the communication data, the communication unit notifies a transmission source corresponding to the transmission source information of communication failure and does not execute transmission that is based on the data received by the reception unit.

10. A method of controlling communication between a container and a process in an information processing apparatus including at least one container built via container-based virtualization technology, at least one process built on a host machine, which is a physical machine, a first storage unit that stores a communication method in association with a container or a process of a transmission source and a container or a process of a transmission destination, and a second storage unit that stores a content of a transmission destination in association with transmission source information and transmission destination information, the method comprising:

receiving, from a container or a process of a transmission source, data including the transmission source information indicating the container or the process of the transmission source, the transmission destination information indicating a container or a process of a transmission destination, and communication data;

referencing the first storage unit and obtaining a communication method of the communication data corresponding to the transmission source information and the transmission destination information included in the received data;

referencing the second storage unit and obtaining the content of transmission destination corresponding to the transmission source information and the transmission destination information included in the received data, wherein the content of the transmission destination indicates destination information used in the obtained communication method; and     transmitting, to the container or the process of the transmission destination indicated by the transmission source information included in the received data, the communication data according to the obtained communication method and the obtained content of transmission destination.

* * * * *